L. G. HANMER.
PIPE STEM.
APPLICATION FILED JAN. 6, 1914.

1,114,753.

Patented Oct. 27, 1914.

WITNESSES

INVENTOR
Lawrence G Hanmer
BY
Duncan & Duncan ATTORNEYS

UNITED STATES PATENT OFFICE.

LAURENCE G. HANMER, OF NEW YORK, N. Y.

PIPE-STEM.

1,114,753.   Specification of Letters Patent.   Patented Oct. 27, 1914.

Application filed January 6, 1914. Serial No. 810,547.

*To all whom it may concern:*

Be it known that I, LAURENCE G. HANMER, a citizen of the United States, and resident of the borough of Brooklyn, county of Kings, city and State of New York, have made a certain new and useful Invention Relating to Pipe-Stems, of which the following is a specification, taken in connection with the accompanying drawing, which forms part of the same.

This invention relates especially to stems for smoking pipes which may be provided with a threaded recess formed in the lower forward portion of the stem to removably support a drain cup having a supporting cup flange which may project laterally beyond and below the adjacent portions of the stem so as to form a support for the pipe when resting on a flat surface. The stem may have an inclined stem bore extending through its upper portion and have a diagonal connecting bore extending upward from the forward portion of the recess into communication with the stem bore to minimize leakage of fluid from the recess into the stem bore.

Figure 1:
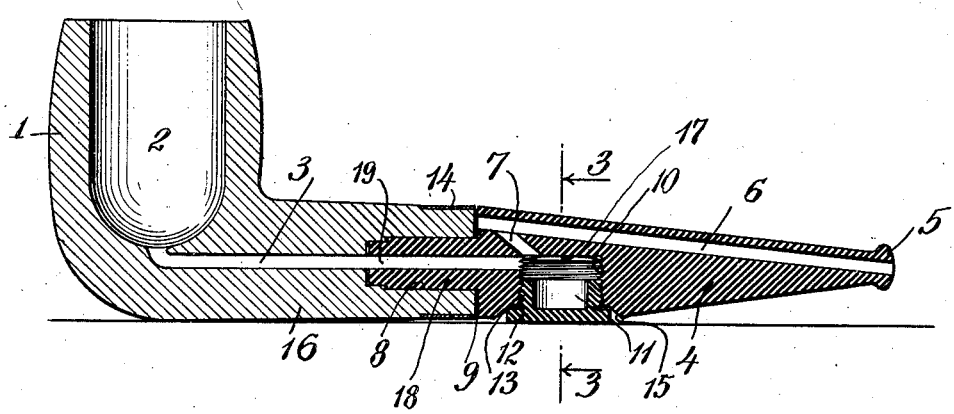
Figure 2:
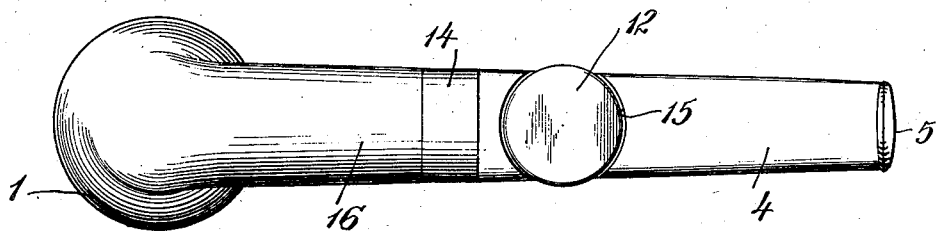
Figure 3:
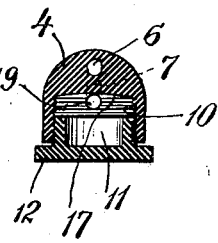

In the accompanying drawings showing in a somewhat diagrammatic way an illustrative embodiment of this invention, Figure 1 is a vertical central section; Fig. 2 is a bottom view, and Fig. 3 is a transverse section taken substantially along the line 3—3 of Fig. 1.

The bowl 1 with which the pipe stem coöperates, may be of any suitable material and construction and may have a suitable stem extension 16 preferably, though not necessarily, arranged substantially in line with the stem. This extension may be provided with the bowl bore 3 communicating with the bowl chamber 2 in any suitable way, and if desired this stem extension may be provided with a strengthening or ornamental metal band such as 14. The stem 4, which may be conveniently formed of suitable plastic material, such as gutta percha, and which may be of any suitable length and shape, but preferably straight as indicated, may be provided with a suitable extension or plug 18 connected in any desired way with the stem extension of the bowl and as shown it may fit within a suitable socket 8 therein so as to form a push-fit at this point. It is desirable to interpose a flexible stem washer, such as 9 on the plug, and if desired substantially covering the joint flange of the stem, where that is necessary, to insure a tight fit between these parts. A suitable removable drain cup is preferably provided in the stem adjacent its forward end and the drain cup 11, which may be used in this connection, may be of hard rubber threaded to engage the threaded socket 10 in the stem, and may also have an enlarged supporting flange 12 at its lower portion of sufficient extent to support the pipe more firmly when laid down on a flat surface as shown in Fig. 1, and also serving as a convenient thumb grip when the pipe is being used by the smoker. This supporting flange may fit into a suitable flange recess 15 in the adjacent parts of the stem and preferably projects laterally beyond the stem at this point so as to be more readily engaged by the fingers for unscrewing it when necessary to clean out the collected material therein. In order to insure a tight joint it is desirable to interpose a suitable washer 13 beneath this cup flange.

While the bores in the stem communicating with the drain cup may be variously arranged it is desirable to use a forwardly and upwardly inclined diagonal connecting bore communicating with the bore through which the smoke is drawn into the mouth which is preferably located in the upper part of the stem. As shown the stem bore 6 is inclined and located in the upper part of the stem, in which it may be conveniently molded substantially parallel to the upper stem surface and extending from the mouth-piece or bit 5 to the forward portion of the stem where it is normally closed by the stem washer 9 which may, however, be readily pushed aside by a cleaning implement when the stem is removed from the bowl. The diagonal connecting bore, such as 7, is preferably made forwardly and upwardly inclined from the point where it communicates with the upper part 17 of the socket, and it communicates with the stem bore adjacent the forward portion thereof. This connecting bore may be conveniently bored by a drill entering the recess angularly and is thus given a direction which facilitates the insertion of cleaning implements therein which may pass out through the forward end of the stem bore 6. The smoke from the bowl may pass through any suitable admission bore such as 19 in the stem plug, and may be conveniently formed in line with the bowl bore 3 and thus carry the smoke into the enlarged chamber above the drain cup which facilitates the deposition and collection of liquid products at this point, the increased area of this chamber being shown in Figs. 1 and 3. By locating the connecting bore adjacent the forward portion of this recess and giving it a forward and upward inclination, leakage of nicotin, etc., into the stem bore is minimized when the pipe is supported in upright position in a pipe-rack or the like.

This invention has been described in connection with illustrative embodiments. forms, proportions, materials and arrangements of parts to the details of which disclosure the invention is not, of course, to be limited, since what is claimed as new and what is desired to be secured by Letters Patent is set forth in the appended claims.

I claim—

1. A smoking pipe comprising a bowl and a stem extension thereon having a bowl bore formed therein, a stem having a plug removably connecting said stem substantially in line with the stem extension on said bowl, a flexible stem washer on said plug and normally covering the joint flange of said stem, a threaded recess formed in the lower forward portion of said stem, a drain cup removably screwed into said recess and provided with a supporting cup flange projecting laterally beyond and below the adjacent portions of said stem to form a support for the pipe when resting on a flat surface, a cup washer beneath said cup flange, an inclined stem bore extending through said stem substantially parallel to its upper surface and extending through the joint flange of the stem beneath said stem washer, an upwardly and forwardly inclined diagonal connecting bore extending from the forward upper portion of said recess into comunication with said stem bore adjacent its forward portion and an admission bore in said stem communicating with said bore bowl and leading into the upper forward portion of said recess.

2. A smoking pipe comprising a bowl and a stem extension having a bowl formed therein, a stem removably connected substantially in line with the stem extension on said bowl, a flexible stem washer normally covering the joint flange of said stem, a recess formed in the lower forward portion of said stem, a drain cup removably mounted in said recess and provided with a supporting cup flange projecting below the adjacent portions of said stem to form a support for the pipe and hold its bowl upright, a stem bore extending through said stem and through the uper portion of the forward joint flange of the stem, an upwardly and forwardly inclined diagonal connecting bore extending from the forward upper portion of said recess into communication with said stem bore adjacent its forward portion and an admission bore in said stem communicating with said bowl bore and leading into the upper portion of said recess.

3. A smoking pipe comprising a bowl and a stem extension having a bowl bore formed therein, a stem removably connected, a recess formed in the lower forward portion of said stem, a drain cup removably mounted in said recess and provided with a supporting cup flange projecting below the adjacent portions of said stem to form a support for the pipe and hold its bowl upright, a stem bore extending through said stem and through the upper portion of the forward joint flange of the stem, a forwardly inclined diagonal connecting bore extending from said recess into communication with said stem bore adjacent its forward portion and an admission bore in said stem communicating with said bowl bore and leading into the upper portion of said recess.

4. A stem for a smoking pipe having a plug to removably connect said stem with a pipe bowl, a threaded recess formed in the lower forward portion of said stem, a drain cup screwed into said recess and provided with a supporting cup flange projecting laterally beyond and below the adjacent portions of said stem to form a support when resting on a flat surface, an inclined stem bore extending through the upper portion of said stem and extending through the joint flange of the stem, an upwardly and forwardly inclined diagonal connecting bore extending from the forward upper portion of said recess into communication with said stem bore adjacent its forward portion and an admission bore leading into the upper forward portion of said recess.

LAURENCE G. HANMER.

Witnesses:
  HARRY L. DUNCAN,
  JESSIE B. KAY.